United States Patent [19]
Handler

[11] Patent Number: 5,792,992
[45] Date of Patent: Aug. 11, 1998

[54] EXPANDABLE SURFACE RACEWAY FOR WIRING

[75] Inventor: Jordan Handler, Stamford, Conn.

[73] Assignee: Zorba Industries, Inc., Jericho, N.Y.

[21] Appl. No.: 548,528

[22] Filed: Oct. 26, 1995

Related U.S. Application Data

[63] Continuation of Ser. No. 235,555, Apr. 28, 1994, abandoned, which is a continuation-in-part of Ser. No. 164,135, Dec. 8, 1993, abandoned.

[51] Int. Cl.⁶ .................................................. H02G 3/04
[52] U.S. Cl. .................. 174/101; 174/48; 52/220.5; 248/49
[58] Field of Search ......................... 174/48, 49, 68.1, 174/68.3, 95, 96, 97, 98, 99 R, 100, 101; 248/49; 52/220.5, 287.1

[56] References Cited

U.S. PATENT DOCUMENTS

| | | | |
|---|---|---|---|
| 4,888,452 | 12/1989 | Krehl et al. | 174/101 |
| 4,907,767 | 3/1990 | Corsi et al. | 174/101 X |
| 4,952,163 | 8/1990 | Dola et al. | 174/48 X |
| 4,990,722 | 2/1991 | Benito Navazo | 174/97 |
| 5,336,849 | 8/1994 | Whiteny | 174/48 |

FOREIGN PATENT DOCUMENTS

| | | | |
|---|---|---|---|
| 0278923 | 2/1987 | European Pat. Off. | |
| 0389382 | 3/1989 | European Pat. Off. | |
| 2425518 | 1/1980 | France | 174/101 |
| 1130492 | 5/1962 | Germany | 174/68.3 |
| 1236621 | 3/1967 | Germany | 138/157 |
| 2804419 | 8/1979 | Germany | 174/101 |
| 1374928 | 11/1974 | United Kingdom | |
| 1433401 | 4/1976 | United Kingdom | 174/101 |
| 2132421 | 7/1984 | United Kingdom | 174/101 |

*Primary Examiner*—Hyung S. Sough
*Attorney, Agent, or Firm*—Ostrolenk, Faber, Gerb & Soffen, LLP

[57] ABSTRACT

An expandable raceway for electrical wiring is constructed of a main section which defines a main passage. In cross-section the main section includes a leg and parallel arms that extend in the same direction from opposite ends of the leg. Each arm is provided with an indexing formation to receive a cooperating indexing formation along the free edge of an arm of an L-shaped auxiliary section for mounting the auxiliary section to the main section without dismounting from a surface to which it is already affixed or dismantling the main section. In cooperation with one arm of the main section, the auxiliary section defines an auxiliary passage outside of the main passage. The auxiliary section includes one arm parallel to the arms of the main section and one arm coplanar with the base of the main section and the latter arm includes the indexing formation thereon covers over the open sides of the sections. A splice connector may join the ends of adjacent sections and the connector is held in fixtures on the sections. The main section may have a divider supported along its length.

23 Claims, 5 Drawing Sheets

EXPANDABLE SURFACE RACEWAY FOR WIRING

CROSS REFERENCE TO RELATED APPLICATION

This is a continuation of U.S. Ser. No. 08/235,555, filed Apr. 28, 1995, which is a continuation-in-part of U.S. Ser. No. 08/164,135, filed Dec. 8, 1993, now both abandoned.

BACKGROUND OF THE INVENTION

This invention relates to surface raceways for electrical wiring in general and relates more particularly to surface raceway systems that are expandable.

Surface raceways are provided for mechanical protection of electrical wiring that runs through the raceway. A prior art surface raceway disclosed in U.S. Pat. No. 3,786,171 provides a single passage for wires. Another prior art raceway, illustrated in German Patent Publication 2 303 593 by Schifferle provides three passages for wires, which passages are formed by dividers which project from a single backing member.

A problem with these and other prior art constructions is that the surface raceway system cannot be expanded once it is installed, and it becomes necessary to provide an entire additional raceway system to carry more wires. To expand an already installed system involves the expense of either dismounting the installation or disassembling it to add expansion elements which may cause costly labor expenses and/or utilization of expensive construction elements.

SUMMARY OF THE INVENTION

In order to overcome these problems of the prior art, this invention provides an expandable surface raceway system. There is a main raceway section having a U-shaped cross-section and defining one passage for wires. The main section is secured to a mounting surface. In order to add additional passages for wires, one or more L-shaped auxiliary sections are added to the main section while the main section remains installed on the mounting surface.

The main raceway section is generally U-shaped and includes a central web or arm, which is secured to a usually vertical mounting surface, and parallel, usually horizontal side arms that extend forward from each of the top and bottom ends of the central arm. Each side arm has an indexing/attachment formation in the vicinity of the corner at which it meets the central arm. Each side arm has a free edge provided with a cover securing formation. Both the indexing/attachment formation and the cover securing formation may extend along the entire length of the main section. Both formations are outside the main passage. The cover securing formation on each side arm is adapted to cooperate with a cooperating formation on a snap-on main cover that is used for closing the open side of the U-shaped main section.

In order to add an auxiliary raceway or wire carrying raceway section, an L-shaped auxiliary section is added by attaching the free end of one arm of an auxiliary section which extends along the free edge of the one arm of the auxiliary section to the indexing/ attachment formation at a first one of the side arms of the main section. This positions the one attached auxiliary arm of the auxiliary section so that it is coplanar with the central arm of the main section while the other second arm of the auxiliary section is held outside of the main raceway passage and parallel to the side arms of the main section. The second arm of the auxiliary section

2 cooperates with the one side arm of the main section to which it is mounted to define an auxiliary raceway.

The auxiliary section is also provided with a respective indexing/attachment formation generally where the arms of the auxiliary section intersect so that yet another auxiliary section may be mounted to the first auxiliary section to cooperate therewith in defining yet another auxiliary passage. Still further auxiliary sections may be mounted to the next preceding auxiliary section in the same manner. Each second auxiliary arm that projects out from the support surface has a respective cover securing formation toward its free edge. Therefore, each auxiliary passage may be provided with a removable cover. When the covers are in place, all of them are coplanar.

Accordingly, the primary object of the invention is to provide a novel construction for an expandable surface raceway system.

Another object is to provide an expandable surface raceway system that utilizes relatively inexpensive parts and is relatively inexpensive to install.

Still another object is to provide a surface raceway system that may be expanded without dismounting or dismantling any sections that are already installed.

A further object is to provide an expandable surface raceway system where expansion is accomplished by adding a selected number of L-shaped auxiliary sections to a C-shaped main section.

Other objects and features of the invention are described in the following description and the accompanying drawings.

DETAILED DESCRIPTION OF THE PREFERRED EMBODIMENTS

Figure 1:
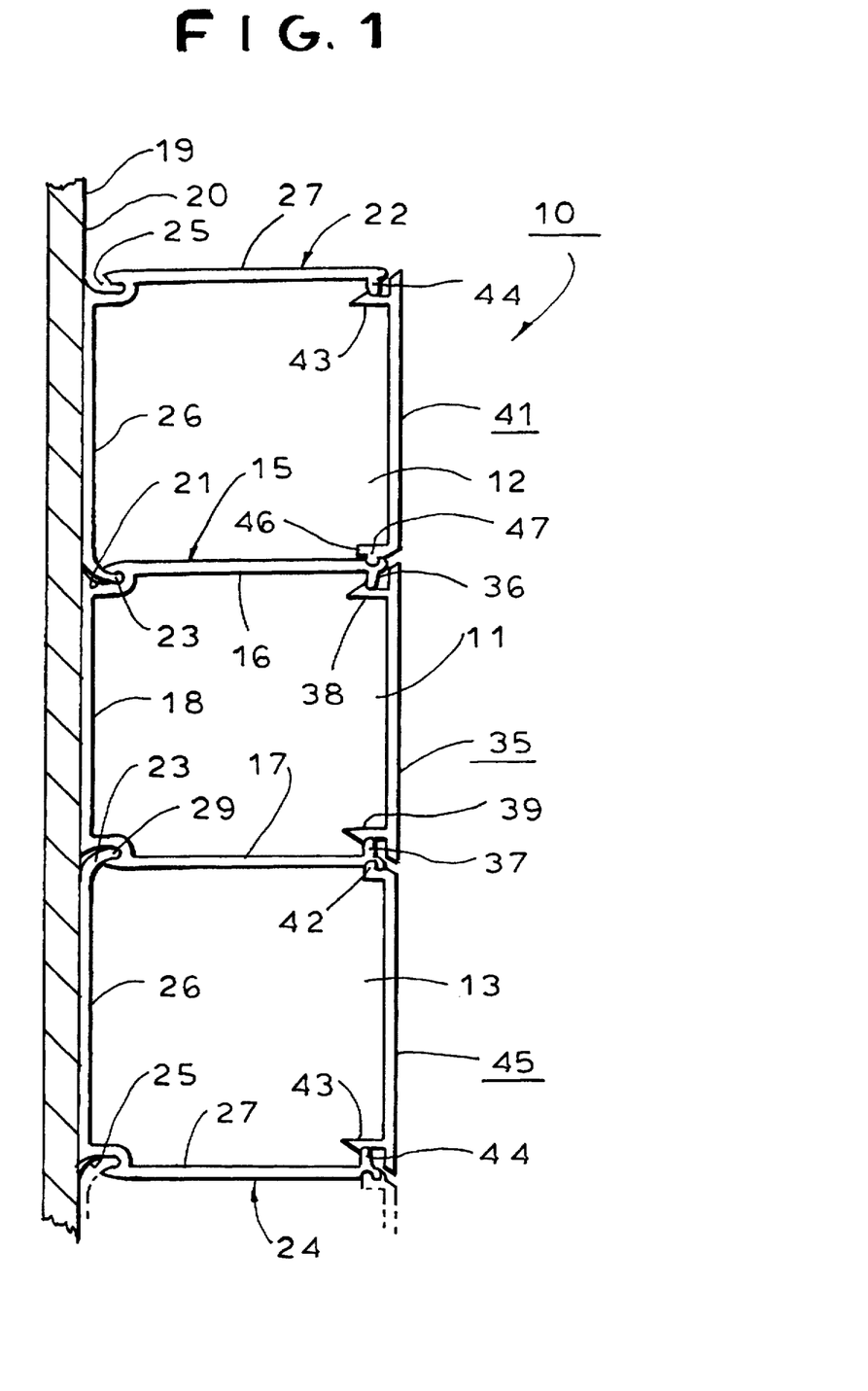
FIG. 1 is an end view of an expandable surface raceway system 10 constructed in accordance with teachings of the instant invention.
Figure 2:
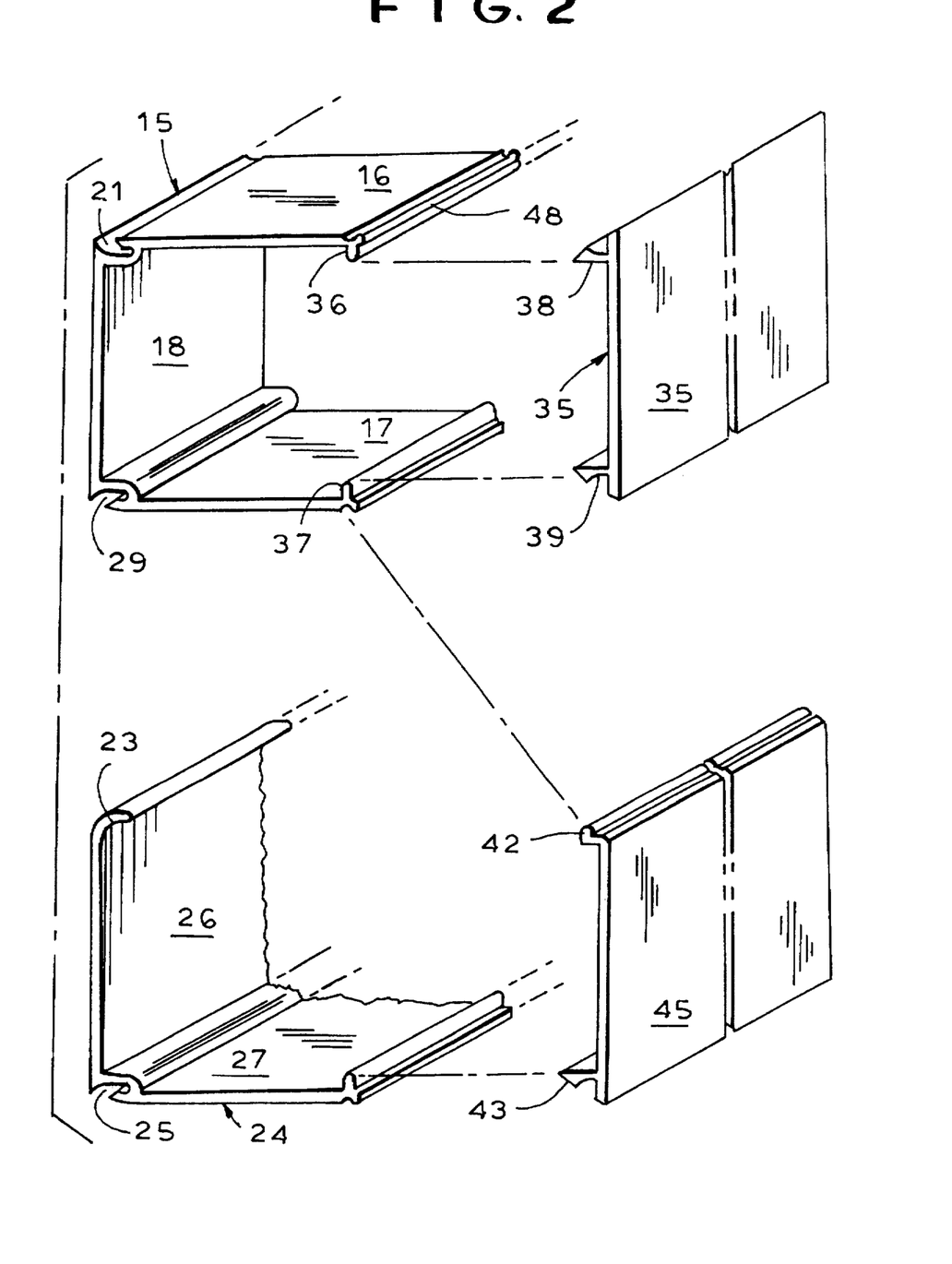
FIG. 2 is an exploded perspective of major elements that are seen in FIG. 1.

The first embodiment of the expandable surface raceway system 10 of the invention, shown in FIGS. 1 and 2, includes main wire passage 11 that is flanked above and below by auxiliary wire passages 12 and 13. Main passage 11 is defined by main raceway section 15 which is of U-shaped cross-section which includes parallel upper and lower arms 16, 17 that extend forward from the respective opposite ends of vertical central arm 18 that is cemented, staked or otherwise secured to mounting surface 19 of a support member, which is typically a vertical wall 20.

In the vicinity of central arm 18, each side arm 16, 17 has an individual indexing/attachment formation, in this embodiment in the form of a slot 21, which extends longitudinally of the main section 15 is and is accessible for its entire length through a surface opening which runs the full length of main section 15 and is positioned to be accessible even when main section 15 is mounted by the arm 18 directly on surface 19.

Auxiliary passage 12 is defined by the cooperation of L-shaped auxiliary section 22 with upper main arm 16 of main section 15. With auxiliary section 22 mounted in its operative position of FIG. 1, its first auxiliary arm 26 is coplanar with the first main arm 18 and its second auxiliary arm 27 is parallel to and spaced from the upper main arm 16 of main section 15. Second auxiliary arm 27 is also provided with the same type of indexing/attachment formation 25 that is also of the same size, shape and placement as formation 21 on the first arm 16 of section 15. The formations 21 and 25, etc. are located so as to be capable of receiving an outwardly angled tab 23 that is along the free edge of the first auxiliary arm 26 of the next installed auxiliary section 22 or 24.

Auxiliary section 22 above and auxiliary section 24 below are identical, but they are mounted to the main section by being oriented to be rotated 180° from one another. Thus, tab 23 of section 24 extends into female type indexing/attachment formation 29 on lower side arm 17 in the vicinity of main central arm 18 so that lower auxiliary passage 13 is defined by the cooperation of auxiliary section 24 with lower side arm 17.

The main section 15 has a respective raceway section cover securing formation on each of side arms 16 and 17, which is in the form of ribs 36, 37 that extend inwardly from the respective arms 16, 17 near their free edges. The ribs 36, 37 cooperate with respective cover formations in the form of holding ribs 38, 39 that project from the interior surface of removable cover 35, to maintain cover 35 in its closed position over the open front side of the main passage 11.

There is also a cover 41 that closes the front side of the auxiliary passage 12. The cover is provided at one long side with a cover mounting formation in the form of an inward extension 46 that includes a rib 47 that is received by a cooperating groove 48 in the exterior surface of arm 16. Holding rib 43 extends inwardly from the other long side of the cover 41 and engages behind the rib 44 projecting from the interior surface of second auxiliary arm 27 at the cover securing formation near the free end of the arm 27, to hold the cover 41 in place.

Removable cover 45 that closes the open front side of the auxiliary passage 13 is identical to cover 41, with a projection 42 being disposed in an external groove of the lower main arm 17 and a holding rib 43 that projects from the outer edge of and at the inner surface of the cover 45 and engages behind the rib 44 that projects inwardly from the second arm 27 of the auxiliary section 24, to hold the cover 45 in its closed position. The cover 35 for main passage 11 and the auxiliary covers 41 and 45 for the auxiliary passages 12 and 13 are coplanar.

As is well known in the art, the main and auxiliary sections 15, 22, 24 and their respective covers 35, 41 and 45 are manufactured in convenient lengths, maybe ten feet each. A number of these lengths are connected end-to-end to form a run of required length. These elements are appropriately shaped for fabrication by extruding a suitable plastic, such as polyvinyl chloride or non-plastic, e.g. metal such as aluminum. In a typical construction, arms 16 and 17 will be 1.75 or 2.25 inches long and leg 18 will be 1.75 or 2.25 inches long.

While holding tabs 38, 39, 43 are indicated as running the full length of sections 15, 22 and 24, these tabs 38, 39, 43 may have large discontinuities. Similarly, each of the covers 35, 41, 45 may comprise a number of end-to-end sections.

In a typical installation arms 18 and 26 are cemented directly on mounting surface 19. Screws (not shown) may be used as a supplement and/or replacement for the cement.

Figure 3:
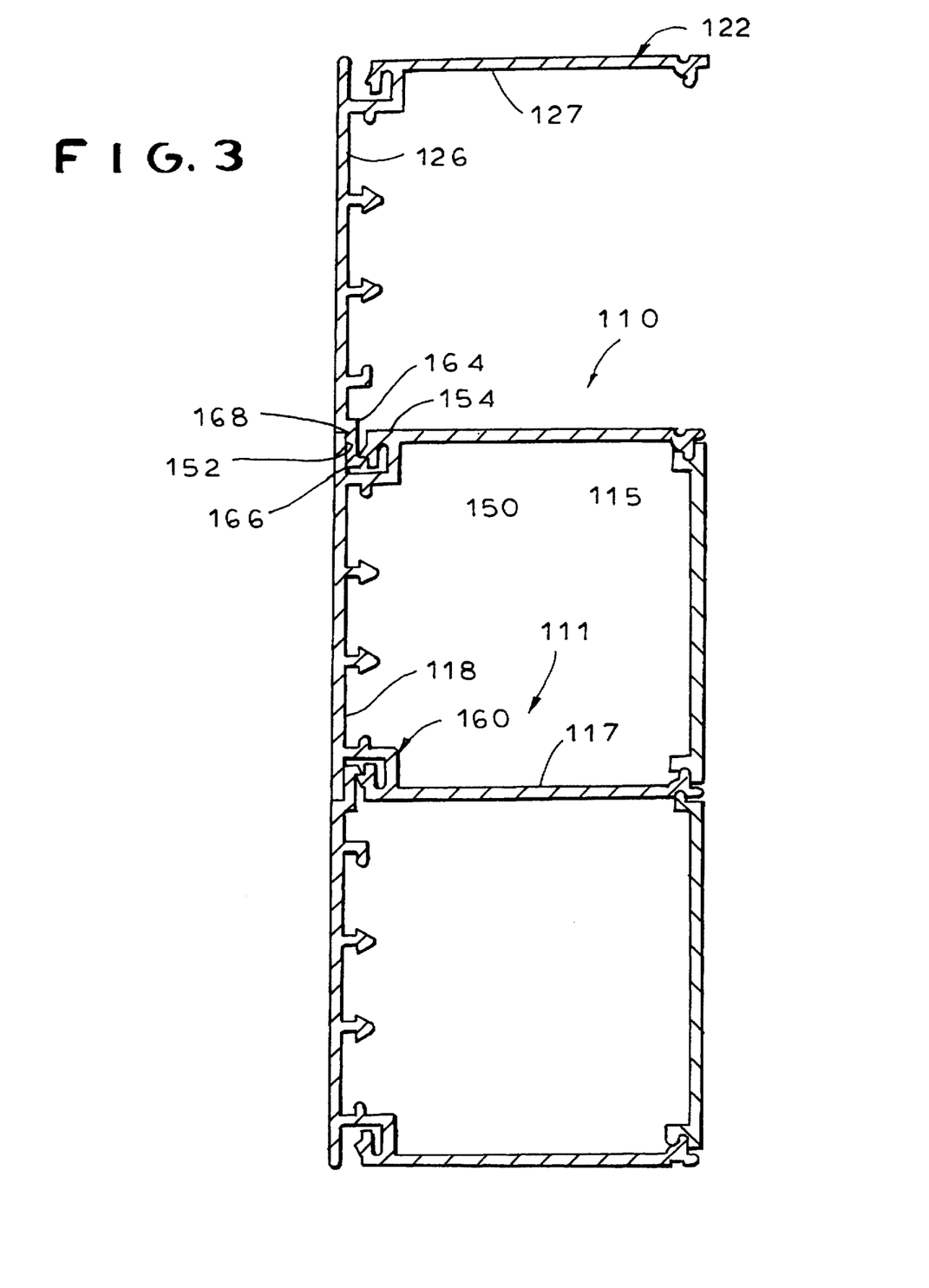
FIG. 3 is an exploded end view of a second embodiment of an expandable surface raceway system.
Figure 4:
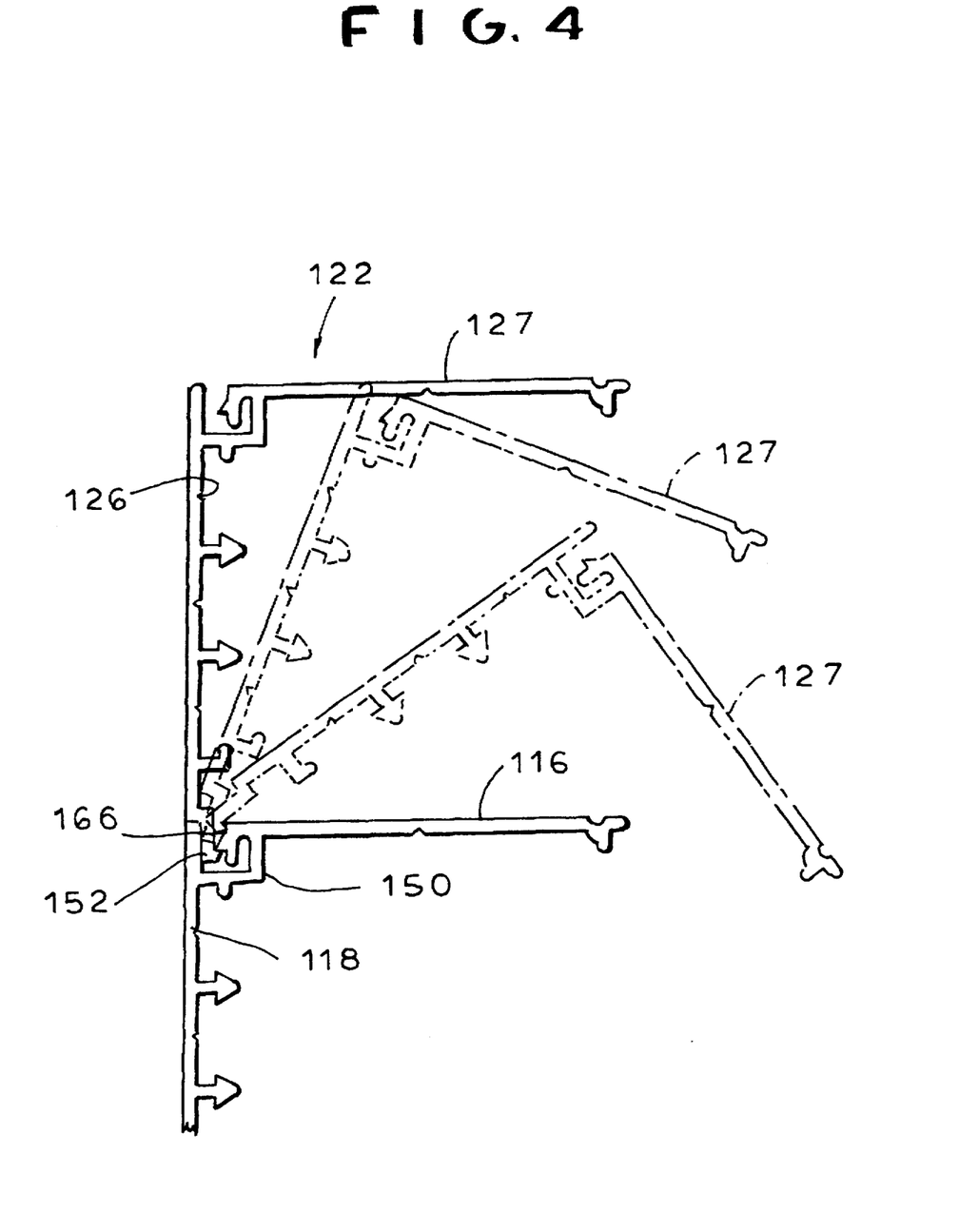
FIG. 4 shows assembly of the system of FIG. 3.

A second embodiment of the invention is illustrated in FIGS. 3 and 4. The basic structure and elements of the expandable raceway 110 shown in these Figures corresponds to those elements in the first embodiment. Where corresponding reference numerals are used in FIGS. 3 and 4, they are the numbers in FIGS. 1 and 2, raised by 100. The primary difference in the second embodiment lies in the formations for connecting the main and auxiliary sections to each other, and they are described in more detail below. Corresponding elements found in the first embodiment are not further described.

The formation 150 on the main section 111 between the first side arm 116 and the central arm 118 comprises a generally U-shaped recess 152 extending along the length of the section 111 and having a supported depending rib 154 extending along the length of the recess and defining a hook there. The corresponding formation 160 between the arms 117 and 118 is of similar design.

The generally L-shaped auxiliary section 122 includes the first auxiliary arm 126, which is coplanar with the central arm 118 of the main section 111, and the second auxiliary arm 127 which is parallel to the first side arm 116 of the main section 111. At the attachable end of the first auxiliary arm 126, the arm includes a securing fixture 164 comprising a slightly hooked, offset depending projection 166 which is offset at 168 sufficiently that the first auxiliary arm 126 of the auxiliary section 122 will be coplanar with the vertical central arm 118 of the central section. The hook 166 is large enough as to hook under the depending hook rib 154 on the main section, when the sections 122 and 111 are in their installed positions.

FIG. 4 shows three positions of the sections 122 and 111, the furthest out-of-plane position being the initial installation position where the depending projection 166 is first inserted into the recess 152, an intermediate rotated position and the third fully upright position where the section arms 118 and 126 are coplanar causes the hooks 154, 166 engage and lock the sections 110 and 111 together. It is apparent that other formations or fixtures for joining the L-shaped auxiliary sections with the U-shaped main section may be developed by one skilled in the art. Desirable in any arrangement are ease of assembly and disassembly, ease of production, e.g. by extrusion, and secure attachment in the mounted position. The second embodiment illustrated satisfies those requirements.

Figure 5:
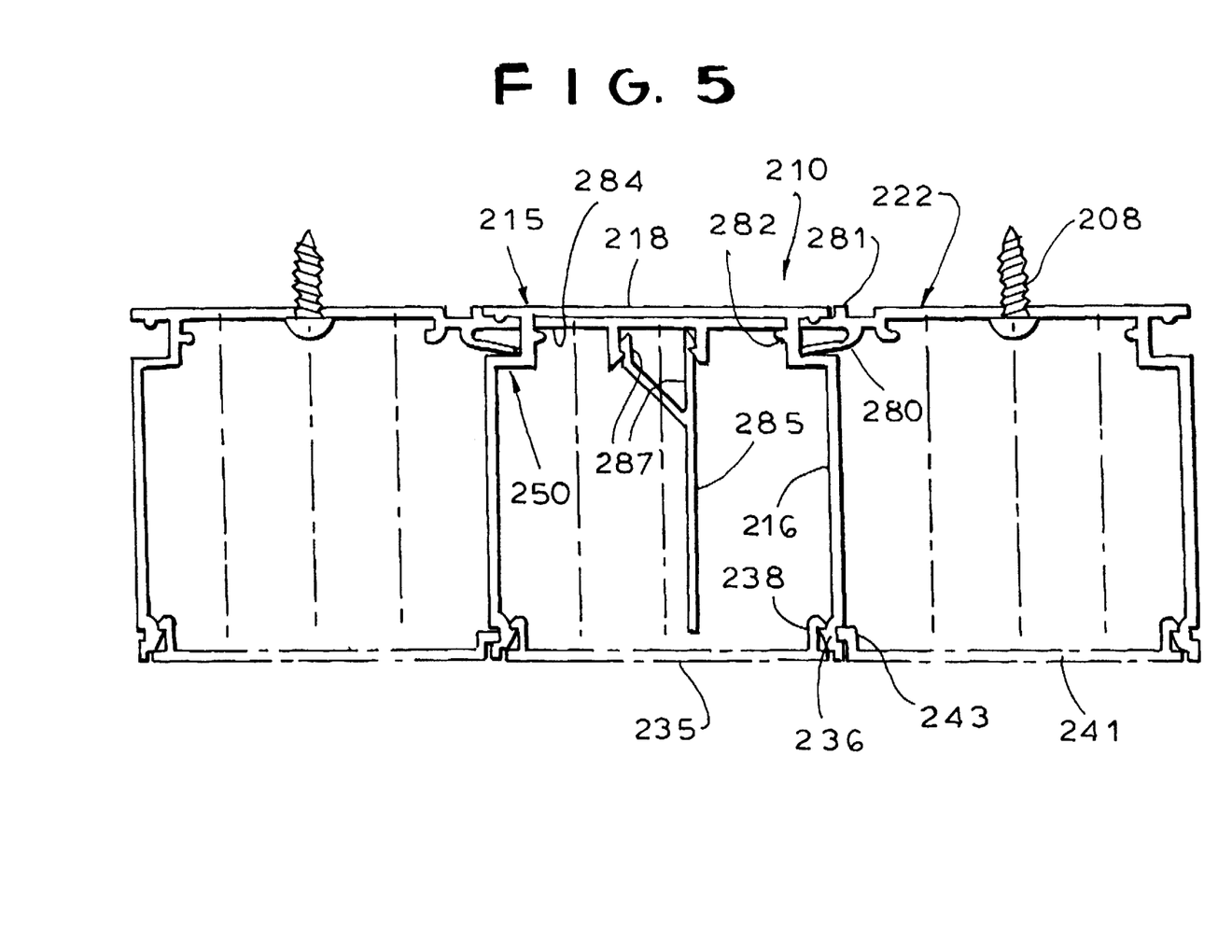
FIG. 5 is an end view of a third embodiment of an expandable surface raceway system.

The third embodiment of the invention is illustrated in FIG. 5. The basic structure and elements of the expandable raceway 210 corresponds to those elements in the first embodiment. Corresponding references numerals used in FIG. 5 are the numerals of the first embodiment raised by 200. The third embodiment shows third sets of formations for connecting the main 215 and auxiliary 222 sections to each other, as well as one version of a modified cover system for the raceways.

The main raceway section 215 is also U-shaped and includes a first main arm 218. It includes formations 250 at both inward corners. Those formations comprise generally U-shaped slots, whose top (actually the lateral) sides open laterally toward the adjacent auxiliary section 222. The auxiliary section 222 is L-shaped as previously, but includes its own U-shaped "alligator jaw" projection 280 of a size to fit comfortably in a U of the formation 250 and the two jaws of the alligator formation 280 are spread apart sufficiently so as to engage the side walls of the opening 250 in the main section 215, thereby to properly position the main and auxiliary sections. To further assure proper registry, there is a projection 281 on one jaw of the alligator jaw fixture which abuts the edge of the inner wall 218 of the main section and helps position the main and auxiliary sections.

The cover 235 on the main section has a slightly differently shaped fixture 238 than the fixture 38, and it cooperates with the cooperatingly shaped fixture 236 formed on the side wall 216 of the main section.

The cover 241 for the auxiliary section also includes a projecting fixture 243 which is received in a groove in the fixture 236. There is similar cooperating fixtures on the cover 241 on the other wall of the auxiliary fixture for holding them together, as in the other embodiments.

The main section 215 of the surface raceway 210 includes additional elements. The web of the U-shaped fixture includes an internal tab 282 which projects toward the corresponding U-shaped fixture on the opposite wall. At the axial ends of the main section 215, which is several feet in length, a splice connector 284 of perhaps only a few inches in length is installed under the tabs of 282 and extends across the interface between adjacent main sections 215. This holds the adjacent main sections in registry and, if the raceway is metal, provides a continuous electrical pathway between the sections, enabling grounding of the raceway.

At the center of the splice connector, there are two depending support tabs 285. A divider panel 286 having outwardly biased legs 287 is detented by hook connections in the tabs 285. The panel 286 extends down through the main section 215 and divides it, creating two separate compartments as may be required in a particular installation. The panel 286 can extend substantially the length of the entire section and need merely be supported by the short length splice connectors between adjacent main sections 215.

Attachment screws 288 are shown for attachment of the auxiliary sections to a support wall. Other attachment means, of course, may be used.

The main and auxiliary sections of all of the embodiments shown herein are preferably extruded sections, preferably metal sections and particularly light weight aluminum sections, so that the raceway system may be grounded. The raceway sections, however, can be extruded of plastic, rather than of aluminum. Plastic in particular has the benefit that the cover, like 235 or 241, can be integrated with one of the side walls, like 216, of a respective section, rather than being removably attached thereto at a fixture. The cover would be attached to the other side wall by a fixture. Where the cover is integrally attached to a side wall, the connection can be at a thinned material region which is thin enough to be flexible and serve as a hinge. Thus, an entire unit including the main or auxiliary section and its respective cover can be extruded at one time as one piece.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An elongated expandable raceway for electrical wiring, said raceway comprising an elongated main section defining a main wiring passage that is generally U-shaped in cross-section, including a central arm with opposite long edges along said section and generally parallel first and second side arms extending forward from said opposite edges of said central arm, said elongated main section having a longitudinal axis along its elongated extent;

said first side arm having a first indexing formation in the vicinity of said central arm;

an elongated auxiliary section having a generally L-shaped cross-section including a first auxiliary arm extending in the direction of said central arm of said main section and with opposite long edges along said section, and a second auxiliary arm extending forward from one said edge of said first auxiliary arm; said first auxiliary arm having a second free edge;

said first indexing formation of said first side arm being disposed and shaped for receiving and mounting said second free edge of said first auxiliary arm, and said first indexing formation being positioned on said first side arm such that said auxiliary section is capable of being mounted thereon in a direction generally traverse to the longitudinal axis of said main section when said central arm of said main section abuts a mounting surface on which said main section is supported;

with said auxiliary section being operatively mounted to said main section by utilizing said first indexing formation, said second auxiliary arm being parallel to and spaced from said first side arm of said main section, and said auxiliary section cooperates with said first side arm to define three sides of a first auxiliary wiring passage that is generally U-shaped in cross-section.

2. An elongated expandable raceway for electrical wiring as defined by claim 1, wherein said first auxiliary arm and said first indexing formation are so shaped and placed that said first auxiliary arm and said central arm are generally coplanar.

3. An elongated raceway for electrical wiring as defined by claim 2 in which said second side arm of said main section has a respective second indexing formation in the vicinity of said central arm;

said second indexing formation being disposed and shaped for receiving and mounting said free edge of said first auxiliary arm, such that said second auxiliary arm is parallel to and spaced from said second side arm and said first auxiliary arm and said central arm are generally coplanar, and said auxiliary section cooperates with said second side arm to define a second auxiliary wiring passage having three sides and is generally U-shaped in cross-section.

4. An elongated raceway for electrical wiring as defined by claim 3 in which said first and second auxiliary wiring passages are disposed outside of said main wiring passage and are disposed along opposite sides of said main section.

5. An elongated raceway for electrical wiring as defined by claim 4 wherein each of said indexing formations comprises a longitudinal slot having a longitudinally extending entrance which is disposed outside of said main wiring passage and which is shaped and positioned to be accessible when said central arm abuts a mounting surface on which said main section is supported.

6. An elongated raceway for electrical wiring as defined by claim 5 wherein said first auxiliary arm has along its free edge an indexing rib shaped to enter said longitudinal slot through said entrance.

7. An elongated raceway for electrical wiring as defined by claim 6 wherein said indexing rib is angled to engage in said slot and prevent removal of said rib from said slot, with said central arm and said auxiliary first arm coplanar.

8. An elongated raceway for electrical wiring as defined by claim 6, wherein said indexing formations each include a projection extending into said slot to serve as a first hook; said first auxiliary arm free edge having a second hook thereon shaped to engage the first hook such that with said first arm and said central arm coplanar, said first and second hooks engage to prevent extraction of said second hook from said elongated slot.

9. An elongated raceway for electrical wiring as defined by claim 6, further comprising a removable snap-on cover for said main wiring passage, and wherein said first and second side arms, in the vicinity of their said free edges, are provided with respective longitudinally extending inwardly projecting first and second holding ribs for operative engagement by respective first and second securing ribs on said removable snap-on cover for said main wiring passage.

10. An elongated raceway for electrical wiring as defined by claim 9 wherein said first and second side arms, in the vicinity of their said free edges, are provided with respective longitudinally extending first and second holding grooves enterable along their lengths from outside of said main wiring passage;

said second auxiliary arm, in the vicinity of its said free edge, being provided with a longitudinally extending auxiliary holding rib;

a removable snap-on auxiliary cover for one of said first and second auxiliary wiring passages, and with said auxiliary section mounted to said main section, said auxiliary holding rib projecting toward said main section for operative engagement by an auxiliary holding rib on said removable snap-on auxiliary cover for one of said first and second auxiliary wiring passages.

11. An elongated raceway for electrical wiring as defined in claim 10 in which said auxiliary cover includes spaced longitudinal first and second edges;

said auxiliary holding rib being in the vicinity of said first edge;

said second edge being adapted to enter said grooves.

12. An elongated raceway for electrical wiring as defined in claim 11 wherein said second auxiliary arm is provided with a longitudinal auxiliary holding groove in the vicinity of its said free edge and an auxiliary indexing formation in the vicinity of said first auxiliary arm;

both said auxiliary holding groove and said auxiliary indexing formation being enterable from outside of an auxiliary wiring passage that is defined by said auxiliary section.

13. An elongated raceway for electrical wiring as defined by claim 10 wherein said cover on said main section and said auxiliary passage cover are generally coplanar when they are closed.

14. An elongated expandable raceway for electrical wiring as defined in claim 3, wherein said first indexing formation of said first side arm is a generally U-shaped formation facing toward said first auxiliary arm;

said first auxiliary arm having a first auxiliary formation for being received in said first indexing formation of said first side of said main section, said first auxiliary formation comprising a U-shaped jaw shaped to fit in said U-shaped first indexing formation, to position said main and auxiliary sections with respect to each other.

15. An elongated raceway for electrical wiring as defined by claim 14, further comprising a main cover over the open side of said U-shaped main section and an auxiliary cover over the open side of said U-shaped auxiliary section;

respective fixtures on each of said covers and respective said walls of said main and auxiliary sections for defining the open sides of those sections so as to enable said covers to be removably fastened to said respective walls of said respective sections.

16. An elongated raceway for electric wiring as defined in claim 3, wherein said raceway is comprised of a series of said main sections arranged end to end and a series of auxiliary sections arranged end to end, with each auxiliary section operatively mounted to the respective said main section;

at the adjacent ends of neighboring main sections, a respective splice connector extending between adjacent sections.

17. An elongated raceway for electrical wiring as defined in claim 16, wherein the splice connector comprises a short length panel that extends across the junction between adjacent main sections;

respective junction fixtures in both of the main sections of a junction for holding said splice connector there.

18. An elongated raceway for electrical wiring as defined in claim 17, further comprising a divider extending from said central arm of said main section toward the open side of the U-shape thereof and extending along said main section to divide it; and a divider fixture on the splice connector for supporting the divider panel.

19. An elongated raceway for electrical wiring as defined in claim 17, wherein said splice connector comprises an essentially flat panel; said splice connector support fixtures on the main section comprise projections from said side arms of said main section inward to and spaced away from said central arm as to define a splice connector support slot at each side of said central arm, and said splice connector being shaped for fitting in the respective said slots at said central arm and said side arms of the main section.

20. An elongated raceway for electrical wiring as defined in claim 19, wherein said divider supporting fixture comprises a pair of detent projections extending from said splice connector toward the open side of said U-shaped main section, and said divider comprises a panel having an end toward said splice connector including a pair of support legs thereon spaced apart for engaging between the pair of projections on the splice connector for supporting the divider panel to said splice connector.

21. An elongated raceway for electrical wiring, said raceway including:

a main wiring passage having a longitudinal extent and a longitudinal axis therethrough and an auxiliary wiring passage outside of said main wiring passage;

said main wiring passage being defined by a main section which in cross-section is generally U-shaped and includes a central arm and first and second parallel side arms extending in the same direction from opposite ends of said central arm;

said auxiliary wiring passage being defined by said first side arm in combination with an auxiliary section;

in cross-section, said auxiliary section being generally L-shaped and including a first auxiliary arm and a second auxiliary arm at one end of said first auxiliary arm and generally at right angles thereto;

said side arms and said second auxiliary arm being generally parallel, and said central arm and said first auxiliary arm being generally coplanar;

said auxiliary section and said main section having respective connecting means which are adapted to cooperate with one another such that said auxiliary section may be operatively positioned onto and connected to said main section in a direction generally transverse to the longitudinal axis of said main passage after said main section is secured to a support surface with said central arm adjacent said support surface.

22. An elongated expandable raceway for electrical wiring, said raceway comprising an elongated main section defining a main wiring passage that is generally U-shaped in cross-section, including a central arm with opposite long edges along said section and generally parallel first and second side arms extending forward from said opposite edges of said central arm, said elongated main section having a longitudinal axis along its elongated extent;

said first side arm having a first indexing formation in a vicinity of said central arm;

an elongated auxiliary section having a generally L-shaped cross-section including a first auxiliary arm extending in the direction of said central arm of said main section and with opposite long edges along said auxiliary section, and a second auxiliary arm extending forward from one said edge of said first auxiliary arm; said first auxiliary arm having a free edge;

said first indexing formation of said first side arm being disposed and shaped for receiving and mounting said free edge of said first auxiliary arm, and said first indexing formation being positioned on said first side arm such that said auxiliary section is capable of being mounted thereon in a direction generally traverse to the longitudinal axis of said main section when said central arm of said main section abuts a mounting surface on which said main section is supported;

with said auxiliary section being operatively mounted to said main section by utilizing said first indexing formation, said second auxiliary arm being parallel to and spaced from said first side arm of said main section, and said auxiliary section cooperates with said first side arm to define three sides of a first auxiliary wiring passage that is generally U-shaped in cross-section;

said first indexing formation having a member extending between said central arm and said first side arm, with said member and said central arm defining a space only open in a direction of said first side arm;

said free edge of said first auxiliary arm being of a generally U-shaped formation to be received in said space of said first indexing formation and to mate therewith.

23. An elongated raceway for electrical wiring as defined in claim 22, wherein said member of said first indexing formation is generally L-shaped as it extends between said central arm and said first side arm.

* * * * *